US00RE50073E

(19) United States
(12) Reissued Patent
Shang et al.

(10) Patent Number: US RE50,073 E
(45) Date of Reissued Patent: Aug. 6, 2024

(54) DUAL-BAND INTERSPERSED CELLULAR BASESTATION ANTENNAS

(71) Applicant: CommScope Technologies LLC, Hickory, NC (US)

(72) Inventors: Chunhui Shang, Guangdong (CN); Bevan Beresford Jones, New South Wales (AU); Ozgur Isik, New South Wales (AU)

(73) Assignee: CommScope Technologies LLC, Claremont, NC (US)

(21) Appl. No.: 17/212,346

(22) Filed: Mar. 25, 2021

Related U.S. Patent Documents

Reissue of:
(64) Patent No.: 10,644,401
Issued: May 5, 2020
Appl. No.: 15/393,333
Filed: Dec. 29, 2016

U.S. Applications:
(63) Continuation of application No. 14/358,763, filed as application No. PCT/CN2012/087300 on Dec. 24, 2012, now Pat. No. 9,570,804.

(51) Int. Cl.
*H01Q 5/321* (2015.01)
*H01Q 1/24* (2006.01)
(Continued)

(52) U.S. Cl.
CPC ..... *H01Q 5/321* (2015.01); *H01Q 1/246* (2013.01); *H01Q 1/52* (2013.01); *H01Q 5/42* (2015.01);
(Continued)

(58) Field of Classification Search
CPC ..... H01Q 5/321
See application file for complete search history.

(56) References Cited

U.S. PATENT DOCUMENTS 4,359,743 A 11/1982 DeSantis
5,387,919 A 2/1995 Lam et al.
(Continued)

FOREIGN PATENT DOCUMENTS

CN 201134512 10/2008
CN 201134512 Y 10/2008
(Continued)

OTHER PUBLICATIONS

Translated Chinese Office Action for corresponding Chinese Application No. 20128004435.4 mailed on Aug. 5, 2016, 12 pages.
(Continued)

*Primary Examiner* — Angela M Lie
(74) *Attorney, Agent, or Firm* — Myers Bigel, P.A.

(57) ABSTRACT

Low-band radiators of an ultra-wideband dual-band dual-polarization cellular basestation antenna and ultra-wideband dual-band dual-polarization cellular base-station antennas are provided. The dual bands comprise low and high bands. The low-band radiator comprises a dipole comprising two dipole arms adapted for the low band and for connection to an antenna feed. At least one dipole arm of the dipole comprises at least two dipole segments and at least one radiofrequency choke. The choke is disposed between the dipole segments. Each choke provides an open circuit or a high impedance separating adjacent dipole segments to minimize induced high band currents in the low-band radiator and consequent disturbance to the high band pattern. The choke is resonant at or near the frequencies of the high band.

41 Claims, 3 Drawing Sheets

(51) Int. Cl.

| | |
|---|---|
| ***H01Q 1/52*** | (2006.01) |
| ***H01Q 5/42*** | (2015.01) |
| ***H01Q 9/16*** | (2006.01) |
| ***H01Q 21/26*** | (2006.01) |
| ***H01Q 21/30*** | (2006.01) |

(52) U.S. Cl.

CPC ..... *H01Q 9/16* (2013.01); *H01Q 21/26* (2013.01); *H01Q 21/30* (2013.01)

(56) References Cited

U.S. PATENT DOCUMENTS

| | | | | |
|---|---|---|---|---|
| 6,552,692 | B1 | 4/2003 | Zeilinger et al. | |
| 2003/0034917 | A1 | 2/2003 | Nishizawa et al. .... | H01Q 5/321 343/795 |
| 2004/0066341 | A1 | 4/2004 | Ito et al. | |
| 2008/0143632 | A1 | 6/2008 | Apostolos | |
| 2010/0283699 | A1 | 11/2010 | Apostolos | |
| 2010/0311325 | A1* | 12/2010 | Marshall ..... | H04B 13/02 505/211 |
| 2011/0063190 | A1* | 3/2011 | Ho ..... | H01Q 1/526 343/912 |
| 2011/0175782 | A1* | 7/2011 | Choi ..... | H01Q 21/24 343/798 |
| 2012/0154236 | A1* | 6/2012 | Apostolos ..... | H01Q 1/32 333/204 |
| 2012/0194401 | A1* | 8/2012 | McLean ..... | H01Q 9/22 343/792 |
| 2012/0293380 | A1 | 11/2012 | Apostolos et al. .... | H01Q 5/321 343/713 |

FOREIGN PATENT DOCUMENTS

| | | | |
|---|---|---|---|
| CN | 102834968 | A | 12/2012 |
| JP | 2000236209 | | 8/2000 |
| JP | 2000236209 | A | 8/2000 |
| JP | 2005176120 | A | 6/2005 |
| WO | 2014100938 | A1 | 7/2014 |

OTHER PUBLICATIONS

"Examination report under sections 12 & 13 of the Patents Act, 1970 and the Patents Rules, 2003, IN Patent Application No. 452/MUMNP/2014, Sep. 24, 2019, 6 pp.".

European Office Action corresponding to European Application No. 15750581.9, dated May 16, 2019, 9 pages.

European Office Action corresponding to European Application No. EP 12 881 985.1-1812, filed on Dec. 24, 2012, dated Feb. 3, 2016, 5 pages.

Second European Office Action corresponding to European Application No. EP 12 881 985.1-1812, filed on Dec. 24, 2012, dated Aug. 11, 2016, 5 pages.

* cited by examiner

DUAL-BAND INTERSPERSED CELLULAR BASESTATION ANTENNAS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This U.S. non-provisional patent application claims priority as a continuation application of U.S. Patent Application Ser. No. 14/358,763, filed May 16, 2014, which in turn is a national stage application under 35 U.S.C. 371 of PCT/CN2012/087300; Filed Dec. 24, 2012.

TECHNICAL FIELD

The present invention relates generally to antennas for cellular systems and in particular to antennas for cellular basestations

BACKGROUND

Developments in wireless technology typically require wireless operators to deploy new antenna equipment in their networks. Disadvantageously, towers have become cluttered with multiple antennas while installation and maintenance have become more complicated. Basestation antennas typically covered a single narrow band. This has resulted in a plethora of antennas being installed at a site. Local governments have imposed restrictions and made getting approval for new sites difficult due to the visual pollution of so many antennas. Some antenna designs have attempted to combine two bands and extend bandwidth, but still many antennas are required due to the proliferation of many air-interface standards and bands.

SUMMARY

The following definitions are provided as general definitions and should in no way limit the scope of the present invention to those terms alone, but are set forth for a better understanding of the following description.

Unless defined otherwise, all technical and scientific terms used herein have the same meaning as commonly understood by those of ordinary skill in the art to which the invention belongs. For the purposes of the present invention, the following terms are defined below:

The articles "a" and "an" are used herein to refer to one or to more than one (i.e. to at least one) of the grammatical object of the article. By way of example, "an element" refers to one element or more than one element.

Throughout this specification, unless the context requires otherwise, the words "comprise", "comprises" and "comprising" will be understood to imply the inclusion of a stated step or element or group of steps or elements, but not the exclusion of any other step or element or group of steps or elements.

In accordance with an aspect of the invention, there is provided a low-band radiator of an ultra-wideband dual-band dual-polarization cellular basestation antenna. The dual bands comprise low and high bands. The low-band radiator comprises a dipole comprising two dipole arms adapted for the low band and for connection to an antenna feed. At least one dipole arm of the dipole comprises at least two dipole segments and at least one radiofrequency (RF) choke. The choke is disposed between the dipole segments. Each choke provides an open circuit or a high impedance separating adjacent dipole segments to minimize induced high band currents in the low-band radiator and consequent disturbance to the high band pattern. The choke is resonant at or near the frequencies of the high band.

Each dipole segment comprises an electrically conducting elongated body; the elongated body is open circuited at one end and short circuited at the other end to a center conductor. The electrically conducting elongated body may be cylindrical or tubular in form, and the center conductor connects the short circuited portions of the dipole segments.

The choke may be a coaxial choke. Each coaxial choke may comprise a protruding portion of center conductor extending between adjacent dipole segments by a gap, and each choke may have a length of a quarter wavelength ($\lambda/4$) or less at frequencies in the bandwidth of the high band.

The low and high bands provide wideband coverage.

The choke may contain lumped circuit elements, or be an open sleeve partly or completely enclosing a center conductor.

The at least one dipole arm may comprise three dipole segments separated by two chokes; adjacent dipole segments are spaced apart about so that there is a gap between the adjacent dipole segments.

The center conductor connecting the short circuited may be an elongated cylindrical electrically conducting body. The center conductor may have a thickness adapted to provide immunity from disturbance of the high-band radiation pattern by the low-band radiator over the entire high-band bandwidth.

The space between each cylindrical conducting body and the center conductor may be filled with air, or filled or partly filled with dielectric material.

The conducting body and a center conductor of each dipole segment may have dimensions optimized so that the radiation pattern of the high band is undisturbed by the presence of the low-band radiator.

The low-band radiator may be adapted for the frequency range of 698-960 MHz.

The two dipole arms of the dipole may each comprise at least two dipole segments, and at least one choke disposed between the dipole segments.

The dipole may be an extended dipole and further comprise another dipole comprising two dipole arms. The dipoles may be configured in a cross configuration, each dipole arm being resonant at approximately a quarter-wavelength ($\lambda/4$), and adapted for connection to an antenna feed. The extended dipole may anti-resonant dipole arms, each dipole arm being of approximately a half-wavelength ($\lambda/2$).

In accordance with another aspect of the invention, there is provided an ultra-wideband dual-band dual-polarization cellular base-station antenna. The dual bands are low and high bands suitable for cellular communications. The dual-band antenna comprises: at least one low-band radiator as set forth in a foregoing aspect of the invention each adapted for dual polarization and providing clear areas on a groundplane of the dual-band antenna for locating high band radiators in the dual-band antenna; and a number of high band radiators each adapted for dual polarization, the high band radiators being configured in at least one array, the low-band radiators being interspersed amongst the high-band radiators at predetermined intervals.

The high-band radiators may be adapted for the frequency range of 1710 to 2690 MHz.

BRIEF DESCRIPTION OF DRAWINGS

Arrangements of low-band radiators of an ultra-wideband dual-band dual-polarization cellular basestation antenna and such dual-band cellular base-station antennas are described hereinafter, by way of an example only, with reference to the accompanying drawings, in which.

DETAILED DESCRIPTION

Figure 1:
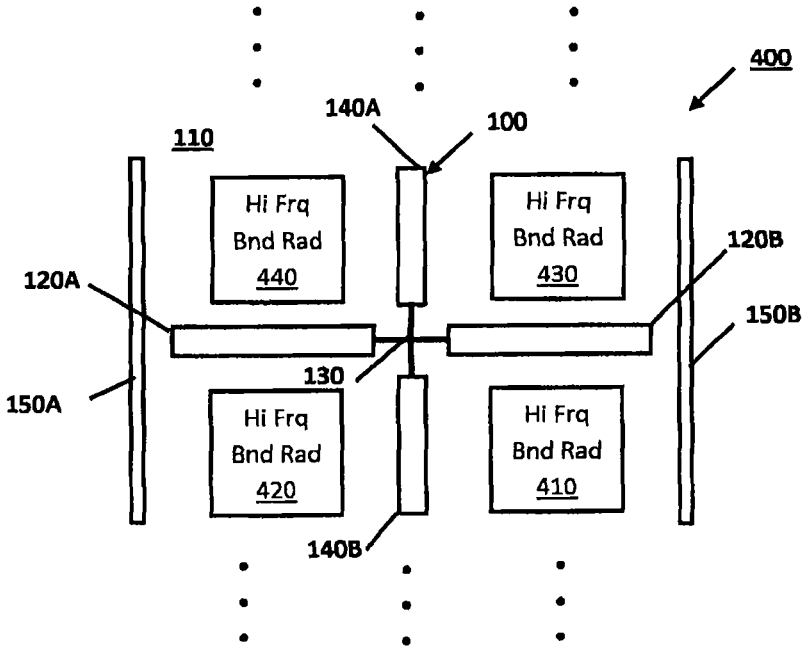
FIG. 1 is a simplified top-plan view of a portion or section of an ultra-wideband, dual-band, dual-polarization cellular basestation antenna comprising high-band and low-band radiators, where the high-band radiators are configured in one or more arrays, with which a low-band radiator in accordance with an embodiment may be practiced, for example.

Hereinafter, low-band radiators of an ultra-wideband dual-band dual-polarization cellular basestation antenna and such dual-band cellular base-station antennas are disclosed. In the following description, numerous specific details, including particular horizontal beamwidths, air-interface standards, dipole arm shapes and materials, dielectric materials, and the like are set forth. However, from this disclosure, it will be apparent to those skilled in the art that modifications and/or substitutions may be made without departing from the scope and spirit of the invention. In other circumstances, specific details may be omitted so as not to obscure the invention.

As used hereinafter, "low band" refers to a lower frequency band, such as 698-960 MHz, and "high band" refers to a higher frequency band, such as 1710 MHz-2690 MHz. A "low band radiator" refers to a radiator for such a lower frequency band, and a "high band radiator" refers to a radiator for such a higher frequency band. The "dual band" comprises the low and high bands referred to throughout this disclosure. Further, "ultra-wideband" with reference to an antenna connotes that the antenna is capable of operating and maintaining its desired characteristics over a bandwidth of at least 30%. Characteristics of particular interest are the beam width and shape and the return loss, which needs to be maintained at a level of at least 15 dB across this band. In the present instance, the ultra-wideband dual-band antenna covers the bands 698-960 MHz and 1710 MHz-2690 MHz. This covers almost the entire bandwidth assigned for all major cellular systems.

The embodiments of the invention relate generally to low-band radiators of an ultra-wideband dual-band dual-polarization cellular basestation antenna and such dual-band cellular base-station antennas adapted to support emerging network technologies. Such ultra-wideband dual-band dual-polarization antennas enable operators of cellular systems ("wireless operators") to use a single type of antenna covering a large number of bands, where multiple antennas were previously required. Such antennas are capable of supporting several major air-interface standards in almost all the assigned cellular frequency bands and allow wireless operators to reduce the number of antennas in their networks, lowering tower leasing costs while increasing speed to market capability. Ultra-wideband dual-band dual-polarization cellular basestation antennas support multiple frequency bands and technology standards. For example, wireless operators can deploy using a single antenna Long Term Evolution (LTE) network for wireless communications in 2.6 GHz and 700 MHz, while supporting Wideband Code Division Multiple Access (W-CDMA) network in 2.1 GHz. For ease of description, the antenna array is considered to be aligned vertically.

The embodiments of the invention relate more specifically to ultra-wideband dual-band antennas with interspersed radiators intended for cellular basestation use and in particular to antennas intended for the low-band frequency band of 698 MHz-960 MHz or part thereof and high frequency band of 1710 MHz-2690 MHz or part thereof. In an interspersed design, typically the low-band radiators are located on an equally spaced grid appropriate to the frequency and then the low-band radiators are placed at intervals that are an integral number of high-band radiators intervals—often two such intervals and the low-band radiator occupies gaps between the high-band radiators. The high-band radiators are normally dual-slant polarized and the low-band radiators are normally dual polarized and may be either vertically and horizontally polarized, or dual slant polarized.

The principal challenge in the design of such ultra-wideband dual-band antennas is minimizing the effect of scattering of the signal at one band by the radiating elements of the other band. The embodiments of the invention aim to minimize the effect of the low-band radiator on the radiation from the high-band radiators. This scattering affects the shapes of the high-band beam in both azimuth and elevation cuts and varies greatly with frequency. In azimuth, typically the beamwidth, beam shape, pointing angle gain, and front-to-back ratio are all affected and vary with frequency in an undesirable way. Because of the periodicity in the array introduced by the low-band radiators, a grating lobe (sometimes referred to as a quantization lobe) is introduced into the elevation pattern at angles corresponding to the periodicity. This also varies with frequency and reduces gain. With narrow band antennas, the effects of this scattering can be compensated to some extent in various ways, such as adjusting beamwidth by offsetting the high-band radiators in opposite directions or adding directors to the high-band radiators. Where wideband coverage is required, correcting these effects is significantly difficult.

The embodiments of the invention reduce the induced current at the high band on the low-band radiating elements by introducing one or more RF chokes that are resonant at or near the frequencies of the high band. Thus, the use of one or more chokes is advantageous in the dipole arms, as described hereinafter. As shown in the drawings, the RF chokes are coaxial chokes, being gaps about a center conductor between cylindrical or tubular conducting bodies. However, the chokes may be practiced otherwise. For example, the chokes may contain lumped circuit elements or be an open sleeve partly or completely enclosing the center conductor. The important point is that the choke presents an open circuit or high impedance across each of the gaps. The embodiments of the invention are particularly effective when applied to a low-band long dipole, which has arms that are anti-resonant approaching half a wavelength (λ/2). For example, adding two high-band chokes to these elements has been found to reduce undesirable effects caused by scattering described above, in particular the grating lobe or quantization lobe is reduced to below −17 dB relative to the main beam in a ten element antenna. Perhaps more important are the reduction in variation of pointing, improvement in front-to back ratio, and stability of azimuth beamwidth.

Ultra-Wideband Dual-Band Dual-Polarization Cellular Basestation Antenna FIG. 1 shows the components of a low-band radiator 100 of a dual band antenna where the radiating elements are oriented to produce vertical and horizontal polarization. Specifically, FIG. 1 illustrates a portion or section 400 of an ultra-wideband, dual-band dual-polarization cellular basestation antenna comprising four high radiators 410, 420, 430, 440 arranged in a 2.times.2 matrix with a low-band radiator 100. A single low-band radiator 100 is interspersed at predetermined intervals with these four high band radiators 410, 420, 430, 440.

In FIG. 1, the low-band radiator 100 comprises a horizontal dipole 120 and a vertical dipole 140. In this particular embodiment of a dual band antenna, the vertical dipole is a conventional dipole 140 and the horizontal dipole 120 is an extended dipole configured in a crossed-dipole arrangement with crossed center feed 130. Center feed 130 comprises two interlocked, crossed printed circuit boards (PCB) having feeds formed on respective PCBs for dipoles 120, 140. The antenna feed may be a balun, of a configuration well known to those skilled in the art.

The center feed 130 suspends the extended dipole 120 above a metal groundplane 110, by preferably a quarter wavelength. A pair of auxiliary radiating elements 150A and 150B, such as tuned parasitic elements or dipoles, or driven dipoles, is located in parallel with the conventional dipole 140 at opposite ends of the extended dipole 120. The tuned parasitic elements may each be a dipole formed on a PCB with metallization formed on the PCB, an inductive element formed between arms of that dipole on the PCB. An inductive element may be formed between the metal arms of the parasitic dipoles 150A, 150B to adjust the phase of the currents in the dipole arms to bring these currents into the optimum relationship to the current in the driven dipole 140. Alternatively, the auxiliary radiating elements may comprise driven dipole elements. The dipole 140 and the pair of auxiliary radiating elements 150 together produce a desired narrower beamwidth.

The dipole 140 is a vertical dipole with dipole arms 140A, 140B that are approximately a quarter wavelength (λ/4), and the extended dipole 120 is a horizontal dipole with dipole arms 120A, 120B that are approximately a half wavelength (λ/2) each. The auxiliary radiating elements 150A and 150B, together with the dipole 140, modify or narrow the horizontal beamwidth in vertical polarization.

The antenna architecture depicted in FIG. 1 includes the low band radiator 100 of an ultra-wideband dual-band cellular basestation antenna having crossed dipoles 120, 140 oriented in the vertical and horizontal directions located at a height of about a quarter wavelength above the metal groundplane 110. This antenna architecture provides a horizontally polarized, desired or predetermined horizontal beamwidth and a wideband match over the band of interest. The pair of laterally displaced auxiliary radiating elements (e.g., parasitic dipoles) 150A, 150B together with the vertically oriented driven dipole 140 provides a similar horizontal beamwidth in vertical polarization. The low-band radiator may be used as a component in a dual-band antenna with an operating bandwidth greater than 30% and a horizontal beamwidth in the range 55.degree. to 75.degree. Still further, the horizontal beamwidths of the two orthogonal polarizations may be in the range of 55 degrees to 75 degrees. Preferably, the horizontal beamwidths of the two orthogonal polarizations may be in the range of 60 degrees to 70 degrees. Most preferably, the horizontal beamwidths of the two orthogonal polarizations are approximately 65 degrees.

The dipole 120 has anti-resonant dipole arms 120A, 120B of length of approximately .lamda./2 with a capacitively coupled feed with an 18 dB impedance bandwidth >32% and providing a beamwidth of approximately 65 degrees. This is one component of a dual polarized element in a dual polar wideband antenna. The single halfwave dipole 140 with the two parallel auxiliary radiating elements 150A, 150B provides the orthogonal polarization to signal radiated by extended dipole 120. The low-band radiator 100 of the ultra-wideband dual-band cellular basestation antenna is well suited for use in the 698-960 MHz cellular band. A particular advantage of this configuration is that this low band radiator 100 leaves unobstructed regions or clear areas of the groundplane where the high-band radiators of the ultra-wideband dual-band antenna can be located with minimum interaction between the low band and high band radiators.

The low-band radiators 100 of the antenna 400 as described radiate vertical and horizontal polarizations. For cellular basestation antennas, dual slant polarizations (linear polarizations inclined at +45.degree. and −45.degree. to vertical) are conventionally used. This can be accomplished by feeding the vertical and horizontal dipoles of the low-band radiator from a wideband 180.degree. hybrid (i.e., an equal-split coupler) well known to those skilled in the art.

The crossed-dipoles 120 and 140 define four quadrants, where the high-band radiators 420 and 410 are located in the lower-left and lower-right quadrants, and the high-band radiators 440 and 430 are Located in the upper-left and upper-right quadrants. The low-band radiator 100 is adapted for dual polarization and provides clear areas on a groundplane 110 of the dual-band antenna 400 for locating the high band radiators 4W, 420, 430, 440 in the dual-band antenna 400. Ellipsis points indicate that a basestation antenna may be formed by repeating portions 400 shown in FIG. 1. The wideband high-band radiators 440, 420 to the left of the centerline comprise one high band array and those high-band radiators 430, 410 to the right of the centerline defined by dipole arms 140A and 140B comprise a second high band array. Together the two arrays can be used to provide MEMO capability in the high band. Each high-band radiator 410, 420, 430, 440 may be adapted to provide a beamwidth of approximately 65 degrees.

For example, each high-band radiator 410, 420, 430, 440 may comprise a pair of crossed dipoles each located in a square metal enclosure. In this case the crossed dipoles are inclined at 45.degree. so as to radiate slant polarization. The dipoles may be implemented as bow-tie dipoles or other wideband dipoles. While specific configurations of dipoles are shown, other dipoles may be implemented using tubes or cylinders or as metallized tracks on a printed circuit board, for example.

While the low-band radiator (crossed dipoles with auxiliary radiating elements) 100 can be used for the 698-960 MHz band, the high-band radiators 410, 420, 430, 440 can be used for the 1.7 GHz to 2.7 GHz (1710-2690 MHz) band. The low-band radiator 100 provides a 65 degree beamwidth with dual polarization (horizontal and vertical polarizations). Such dual polarization is required for basestation antennas. The conventional dipole 140 is connected to an antenna feed, while the extended dipole 120 is coupled to the antenna feed by a series inductor and capacitor. The low-band auxiliary radiating elements (e.g., parasitic dipoles) 150 and the vertical dipole 140 make the horizontal beamwidth of the vertical dipole 140 together with the auxiliary radiating elements 150 the same as that of the horizontal dipole 120. The antenna 400 implements a multi-band antenna in a single antenna. Beamwidths of approximately 65 degrees are preferred, but may be in the range of 60 degrees to 70 degrees on a single degree basis (e.g., 60, 61, or 62 degrees). This ultra-wideband, dual-band cellular basestation antenna can be implemented in a limited physical space.

Low Band Radiator

To minimize interaction between low and high band radiators in a dual-polarization, dual-band cellular basestation antenna, the low band radiators are desirably in the form of vertical and horizontal radiating components to leave an unobstructed space for placing the high-band radiators. To radiate dual-slant linear polarization using radiator components that radiate horizontal and vertical polarizations, an ultra-wideband 180.degree. hybrid may be used to feed the horizontal and vertical components of a radiator of one band of an ultra-wideband dual-band dual-polarization cellular basestation antenna, e.g., the low band.

Figure 2A:
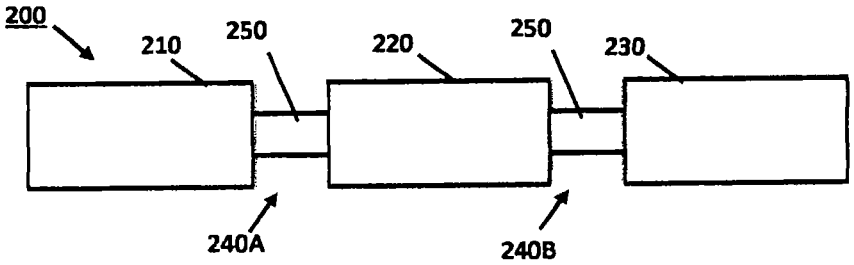
FIGS. 2A and 2B are side-view and end-view block diagrams illustrating a dipole arm of a low-band radiator for an ultra-wideband dual-band dual-polarization cellular basestation antenna in accordance with an embodiment of the invention, which in this example has three dipole segments interspersed with (separated by) two radiofrequency (RI) chokes, the dipole segments comprising an miter cylindrical conducting body disposed about an inner center conductor, and the chokes being gaps between the dipole segments located about the center conductor.
Figure 2B:
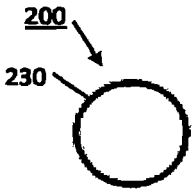
Figure 3:
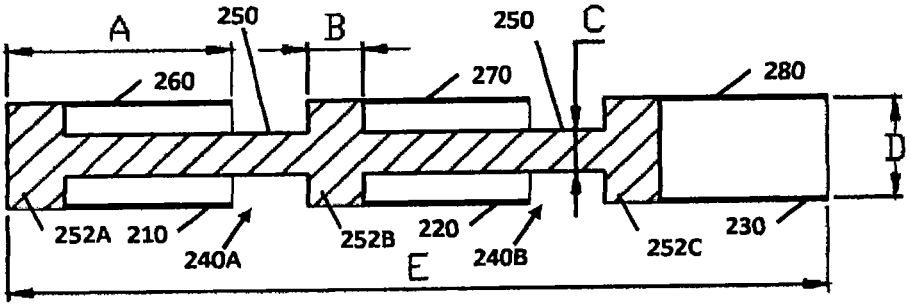
FIG. 3 is a cross-sectional view of the dipole arm shown in FIG. 2.

FIGS. 2 and 3 illustrate a dipole arm 200 of a low-band radiator 100 for use in an ultra-wideband dual-band dual-polarization cellular basestation antenna 400, where the dual bands comprise low and high bands. This dipole arm 200 may be used to implement one or more of dipole arms 120A, 120B, 140A, and 140B shown in FIG. 1. Importantly, the dipole arm 200 uses one or more RF chokes. The dipole arm comprises, in this example, three dipole segments 210, 220, 230 separated by two RF (coaxial) chokes 240A and 240B each interspersed between adjacent dipole segments 210, 220, 230 (from left to right the dipole arm components are 210, 240A, 220, 240B, 230). Each choke 240A and 240B provides an open circuit or a high impedance separating adjacent dipole segments to minimize induced high band currents in the low-band radiator 100 and consequent disturbance to the high band pattern. The choke 240A and 240B is resonant at or near the frequencies of the high band. While a specific implementation of the dipole arm with three dipole segments 210, 220, and 230 is illustrated and described hereinafter, the embodiments of the invention are not so limited. For example, the dipole arm 200 may be implemented with two or four dipole segments with respectively one or three RF chokes. Other numbers of dipole segments and related RF chokes may be practiced without departing from the scope of the invention. As best seen in FIG. 3, which provides a cross-sectional view of the dipole arm 200 along its longitudinal extent, the coaxial chokes 240A and 240B being the gaps about the center conductor 250 between dipole segments 210, 220, 230 of the dipole arm 200. Each dipole segment 210 and 220 comprises an outer cylindrical conducting body 260 and 270, respectively, disposed about an inner center conductor 250. The rightmost dipole segment 280 is connected by a short-circuit connection 252C to the center conductor 250, but itself does not need the center conductor 250 beyond the short circuit connection 252C as the dipole segment 280 connects to the dipole feed as would a dipole without chokes.

As shown in FIG. 1, a dipole 120, 140 comprises two dipole arms 120A, 120B, 140A, 140B adapted for the low band and for connection to an antenna feed 130. At least one of the dipole arms 120A, 120B, 140A, 140B comprises at least one RF choke, and in the embodiment shown in FIG. 3 two coaxial chokes being the gaps in the outer cylindrical tube near 240A and 240B. Each dipole segment 210 and 220 is open circuited at one end of the cylindrical conducting body 260 and 270 and short circuited 252A and 252B, respectively, at the other end to the center conductor 250. The center conductor 250 may comprise short-circuit conductors 252A, 252B, 252C with center conductor segment 250 extending between short-circuit conductors 252A and 252B, and center conductor segment 250 extending between short-circuit conductors 252B and 252C. The components 252A, 250, 252B, 250, 252C may be a single integrated conducting body. Each coaxial choke 240A and 240B has a protruding portion of the center conductor 250 extending beyond the cylindrical conducting body 260 and 270. The chokes, being coaxial chokes, are the gaps in the outer conductor near locations 240A and 240B backed by the (approximately) quarter wave coaxial section. This gap interrupts the high band currents.

As shown in FIG. 3, each cylindrical conducting body 260, 270, and 280 has a length A and a diameter D. The short-circuit portions 252A, 252B, 252C have a thickness B. The diameter of center conductor 250 is C. The overall length of the dipole arm 200 comprising three dipole segments 260, 270, and 280 is length E,

| Dimension | Value (mm) 698-960 MHz 1710-2690 MHz |
|---|---|
| A | 30.0 |
| B | 8.2 |
| C | 6.0 |
| D | 14.5 |
| E | 111.0 |

The dipole arm 200 may comprise at least two dipole segments 210, 220. Adjacent dipole segments 210 and 220 on the one hand and 220 and 230 on the other hand are spaced apart about the center conductor 250 so that there is a gap between the adjacent dipole segments 210, 220. The dimensions of the components of the coaxial chokes are such as to place the resonance of the coaxial choke 240A, 240B in the high band. The center conductor 250 may be an elongated cylindrical conducting body. The thickness or diameter C of the center conductor influences the bandwidth of the choke and may be adapted to minimize the high-band current over the whole of the high band thereby providing immunity from disturbance of the high-band radiation pattern by the low-band radiator 100 over the entire high-band bandwidth.

The space between the cylindrical conducting body 260, 270, 280 and the center conductor 250 may be filled with air, as depicted in FIG. 3. Alternatively, the space between the cylindrical conducting body 260, 270, 280 and the center conductor 250 may be filled or partly filled with dielectric material.

The cylindrical conducting body 260, 270, 280 and the center conductor 250 of each dipole segment 210, 220, 230 have dimensions optimized so that the radiation pattern of the high band is largely undisturbed by the presence of the low-band radiator 100. The radiator 100 is adapted for the frequency range of 698-960 MHz.

The dipole may be an extended dipole 120 and the radiator 100 may further comprise another dipole 140 comprising two dipole arms. The dipoles 120, 140 are configured hi a cross configuration. Each dipole arm is resonant at approximately a quarter-wavelength (λ/4) and is adapted for connection to an antenna feed. The extended dipole 120 has anti-resonant dipole arms. Each dipole arm is of approximately a half-wavelength (λ/2).

In accordance with another embodiment of the invention, an ultra-wideband dual-band dual-polarization cellular base-station antenna 400 is provided comprising at least one low-band radiator 100 and a number of high-band radiators 410, 420, 430, 440. The dual bands are low and high bands suitable for cellular communications. Each low-band radiator 100 is adapted for dual polarization and provides clear areas on a groundplane 110 of the dual-band antenna 400 for locating high band radiators 410, 420, 430, 440 in the dual-band antenna 400. The high band radiators 410, 420, 430, 440 are each adapted for dual polarization. The high-band radiators 410, 420, 430, 440 are configured in at least one array. The low-band radiator 100 is interspersed amongst the high-band radiators 410, 420, 430, 440 at predetermined intervals. The high-band radiators 410, 420, 430, 440 are adapted for the frequency range of 1710 to 2690 MHz.

Figure 4:
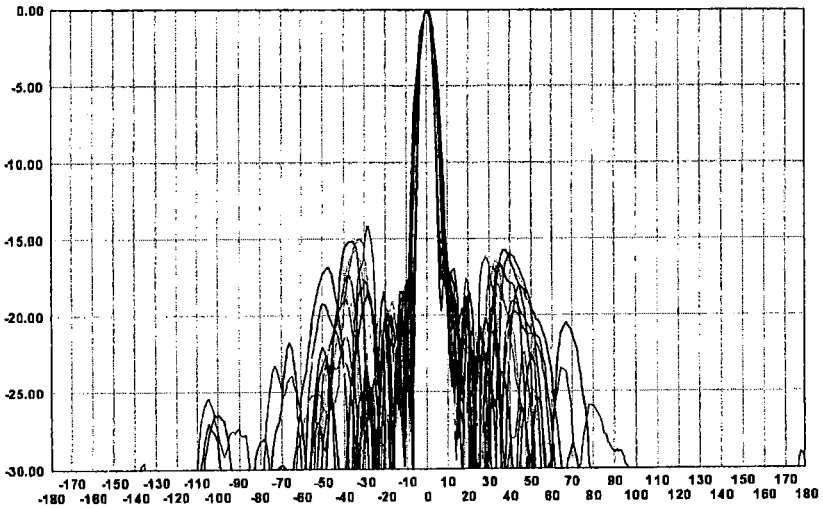
FIG. 4 is a plot of an elevation pattern for a high-band radiator(s) where the low-band horizontal dipole is implemented using brass-tube for the dipole arms.
Figure 5:
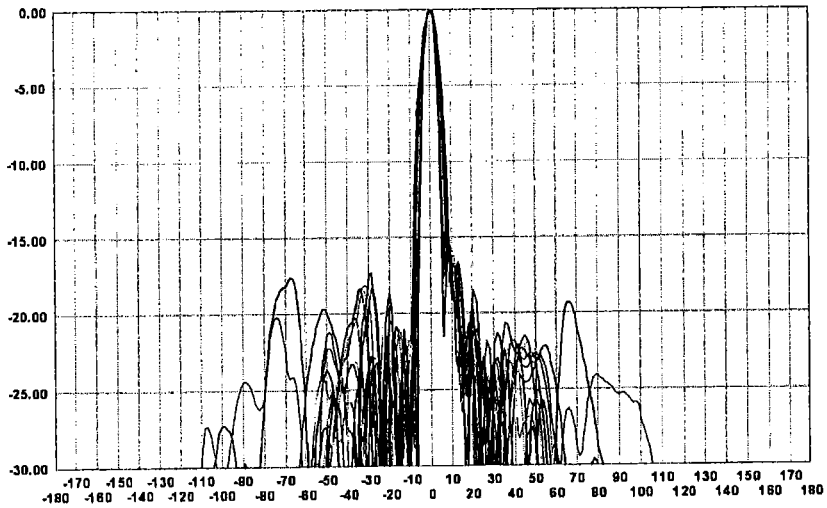
FIG. 5 is a plot of an elevation pattern for a high-band radiator(s) where the low-band horizontal dipole is implemented using three dipole segments separated by two chokes for the dipole arms.
Figure 6:
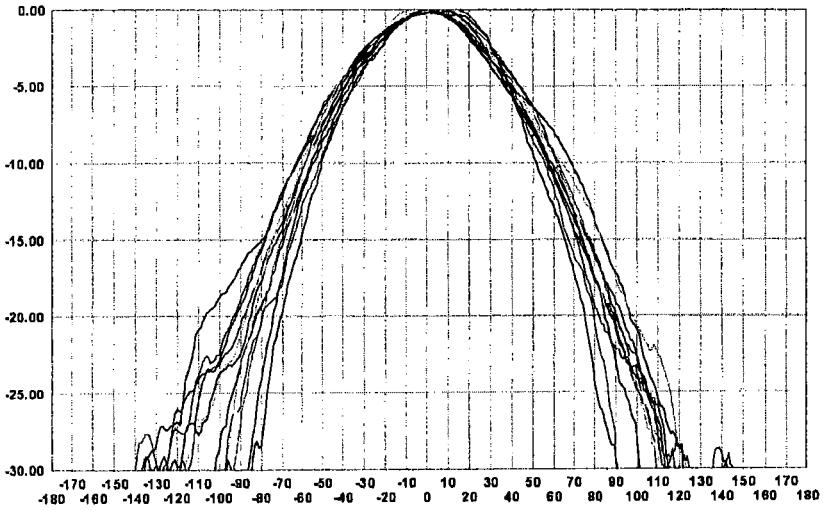
FIG. 6 is a plot of an azimuth pattern for a high-band radiator(s) where the low-band horizontal dipole is implemented using brass-tube for the dipole arms.
Figure 7:
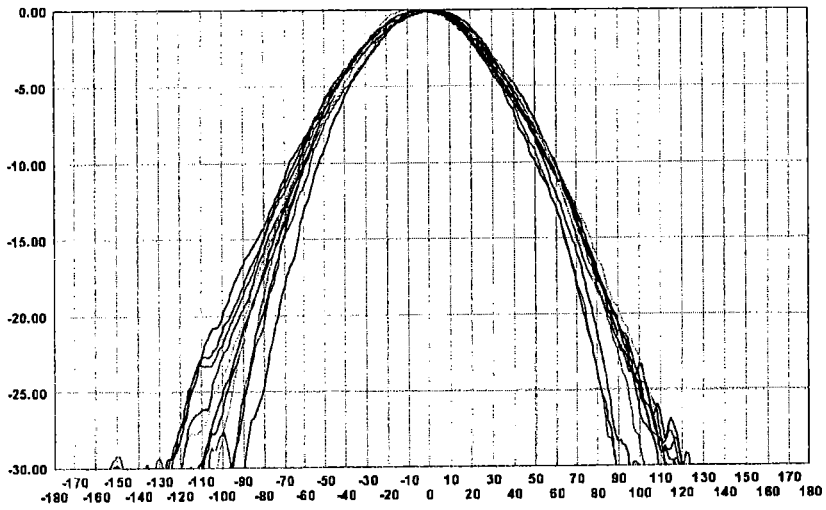
FIG. 7 is a plot of an azimuth pattern for a high-band radiator(s) where the low-band horizontal dipole is implemented using three dipole segments separated by two chokes for the dipole arms.

FIGS. 4 and 6 illustrate the superposition elevation and azimuth patterns for a high-band radiator(s) at a number of equally spaced frequencies across the high band where brass-tube dipole arms implement the low-band horizontal dipole, and FIGS. 5 and 7 illustrate the corresponding elevation and azimuth patterns for a high-band radiator(s) where the low-band horizontal dipole is fitted with two chokes. Of particular note are the reduced level of sidelobes associated with the periodicity of the low-band elements where the chokes are used (FIG. 5). The azimuth patterns are more stable with frequency with less tendency to flare out at wide angles.

Thus, low-band radiators of an ultra-wideband dual-band dual-polarization cellular basestation antenna and such dual-band cellular base-station antennas described herein and/or shown in the drawings are presented by way of example only and are not limiting as to the scope of the invention. Unless otherwise specifically stated, individual aspects and components of the hybrids may be modified, or may have been substituted therefore known equivalents, or as yet unknown substitutes such as may be developed in the future or such as may be found to be acceptable substitutes in the future.

The invention claimed is:

1. A base station antenna, comprising:

a low-band radiating element that is configured to radiate in a low frequency band, the low-band radiating element including *a first dipole antenna comprising* a first dipole arm and a second dipole arm that are connected to a first antenna feed, *the low-band radiating element comprising a second dipole antenna comprising a third dipole arm and a fourth dipole arm that are configured in a cross configuration with the first dipole arm and the second dipole arm of the first dipole antenna*; and a plurality of high-band radiating elements that are configured to radiate in a high frequency band that is higher than the low frequency band, wherein the first dipole arm includes a first dipole segment and a second dipole segment that are separated by a resonating element that resonates in or near the high frequency band, *and*

*wherein the third dipole arm and the fourth dipole arm are each resonant at approximately a quarter wavelength (λ/4)*.

2. The base station antenna of claim 1, wherein the resonating element comprises a radio frequency (RF) choke.

3. The base station antenna of claim 1, wherein the low-band radiating element comprises a conductor that includes gaps that behave as an open circuit to reduce the effect of radiation emitted by the low-band radiating element on the radiation emitted by the high-band radiating elements.

4. The base station antenna of claim 1, wherein the low-band radiating element comprises a conductor that includes gaps that behave as a high impedance to reduce the effect of radiation emitted by the low-band radiating element on the radiation emitted by the high-band radiating elements.

5. The base station antenna of claim 1, wherein the first dipole segment comprises an electrically conducting elongated body, and wherein the elongated body is open circuited at one end and short circuited at another end to a center conductor.

6. The base station antenna of claim 5, wherein the electrically conducting elongated body is cylindrical or tubular in form.

7. The base station antenna of claim 5, wherein the center conductor connects to the another end that is short circuited to the center conductor.

8. The base station antenna of claim 1, wherein the resonating element comprises a coaxial choke.

9. The base station antenna of claim 6, wherein the electrically conducting elongated body is cylindrical.

10. The base station antenna of claim 9, wherein the space between the electrically conducting elongated body that is cylindrical and the center conductor is partially filled with air.

11. The base station antenna of claim 9, wherein the space between the electrically conducting elongated body that is cylindrical and the center conductor is filled or partly filled with dielectric material.

12. The base station antenna of claim 1, wherein the low-band radiating element operates in a frequency range of 698-960 MHz.

[13. The base station antenna of claim 1, wherein the low-band radiating element comprises a first dipole antenna, and wherein the base station antenna further comprises:

a second dipole antenna comprising a third dipole arm and a fourth dipole arm that are configured in a cross configuration with the first dipole arm and the second dipole arm of the first dipole antenna, wherein the third dipole arm and the fourth dipole arm are each resonant at approximately a quarter wavelength (λ/4).]

14. A multi-band base station antenna including a first radiating element comprising a first dipole radiating element operating in a first frequency band and a second radiating element operating in a second frequency band, the first dipole radiating element comprising:

a first dipole arm;

a second dipole arm; and a feed line coupled to the first and second dipole arms, wherein the first and second dipole arms each further comprise an inner conductor and a plurality of discontinuous outer conductors, the plurality of discontinuous outer conductors being open circuited at a first end and short circuited at a second end, and wherein a discontinuity in the plurality of discontinuous outer conductors comprises a radio frequency (RF) choke that is dimensioned to be resonant at or near the second frequency band.

15. The multi-band base station antenna of claim 14, wherein the wherein an outer conductor of the plurality of discontinuous outer conductors comprises an electrically conducting elongated body, and wherein the elongated body is open circuited at one end and short circuited at another end to the inner conductor.

16. A low-band radiator of an ultra-wideband dual-band dual-polarization cellular basestation antenna, the bands comprising low and high bands, the low-band radiator comprising:

a dipole antenna comprising a first dipole arm and a second dipole arm adapted for the low band and for connection to an antenna feed, wherein the first dipole arm comprises a first dipole segment and a second dipole segment separated by a coaxial choke disposed between the first dipole segment and the second dipole segment, and wherein the coaxial choke is resonant at or near the frequencies of the high band thereby reducing induced high band currents in the low-band radiator and consequent disturbance to the high band.

17. The low-band radiator of claim 16, wherein the coaxial choke comprises a center conductor and a gap in an outer conductor of the coaxial choke protruding from a portion of the center conductor that extends between the first dipole segment and the second dipole segment, and wherein the coaxial choke has a length of a quarter wavelength ($\lambda/4$) or less at frequencies in the bandwidth of the high band.

18. The low-band radiator of claim 16, wherein the RF choke provides an open circuit between the first dipole segment and the second dipole segment.

19. The low-band radiator of claim 16, wherein the RF choke provides a high impedance between the first dipole segment and the second dipole segment.

20. The low-band radiator of claim 16, wherein the center conductor has a thickness adapted to provide immunity from disturbance of the high-band radiation pattern by the low-band radiator over the entire high-band bandwidth.

21. The low-band radiator of claim 16, [further comprising:] *in combination with* parasitic dipole elements that are substantially parallel to the first dipole arm and/or the second dipole arm, and are configured to adjust phase of a current in the first dipole arm and/or the second dipole arm.

*22. A base station antenna, comprising:*

*a lower frequency band radiator;*

*a higher frequency band radiator;*

*a first parasitic element that includes a first metal dipole arm, a second metal dipole arm and a first inductive element coupled between the first metal dipole arm and the second metal dipole arm; and*

*a second parasitic element that includes a third metal dipole arm, a fourth metal dipole arm and a second inductive element coupled between the third metal dipole arm and the fourth metal dipole arm,*

*wherein the first and second parasitic elements together with a first dipole of the lower frequency band radiator are configured to narrow a horizontal beamwidth of an antenna beam generated by the lower frequency band radiator.*

*23. The base station antenna of claim 22, wherein the higher frequency band radiator is part of a vertically-extending array of higher frequency band radiators, wherein the first and second parasitic elements are on opposite sides of the lower frequency band radiator, and wherein the lower frequency band radiator is positioned along a horizontal axis that connects the first and second parasitic elements.*

*24. A base station antenna, comprising:*

*a lower frequency band radiator;*

*a higher frequency band radiator;*

*a first parasitic element that includes a first metal dipole arm, a second metal dipole arm and a first inductive element coupled between the first metal dipole arm and the second metal dipole arm; and*

*a second parasitic element that includes a third metal dipole arm, a fourth metal dipole arm and a second inductive element coupled between the third metal dipole arm and the fourth metal dipole arm,*

*wherein the lower frequency band radiator comprises a first lower frequency band radiator of an array of lower frequency band radiators, and wherein the first lower frequency band radiator is positioned between the first parasitic element and the second parasitic element.*

*25. The base station antenna of claim 24, wherein the higher frequency band radiator comprises a first higher frequency band radiator of an array of higher frequency band radiators, wherein the array of higher frequency band radiators is positioned in between the first parasitic element and the array of lower frequency band radiators.*

*26. The base station antenna of claim 25, wherein the array of lower frequency band radiators is a vertically-extending array of lower frequency band radiators, wherein the array of higher frequency band radiators is a vertically-extending array of higher frequency band radiators, and wherein the first lower frequency band radiator is positioned along a horizontal axis that extends between the first parasitic element and the second parasitic element.*

*27. A base station antenna, comprising:*

*a lower frequency band radiator;*

*a higher frequency band radiator; and*

*a first parasitic element that includes a first metal dipole arm, a second metal dipole arm and a first inductive element coupled between the first metal dipole arm and the second metal dipole arm,*

*wherein the lower frequency band radiator is part of a vertically-extending array of lower frequency band radiators, wherein the higher frequency band radiator is part of a vertically-extending array of higher frequency band radiators, and wherein the first parasitic element is part of a first vertically-extending array of parasitic elements.*

*28. The base station antenna of claim 27, wherein the vertically-extending array of higher frequency band radiators is positioned between the vertically-extending array of*

*higher frequency band radiators and the first vertically-extending array of parasitic elements.*

*29. The base station antenna of claim 28, further comprising a second vertically-extending array of parasitic elements, wherein the vertically-extending array of lower frequency band radiators is positioned between the first and second vertically-extending arrays of parasitic elements.*

*30. A base station antenna, comprising:*

*a lower frequency band radiator;*

*a higher frequency band radiator; and*

*a first parasitic element that includes a first metal dipole arm, a second metal dipole arm and a first inductive element coupled between the first metal dipole arm and the second metal dipole arm,*

*wherein the first and second metal dipole arms comprise metallization on a printed circuit board.*

*31. The base station antenna of claim 30, wherein the first inductive element is configured to adjust the phase of currents in the first and second dipole arms.*

*32. The base station antenna of claim 31, wherein the first inductive element is configured to adjust the phase of currents in the first and second dipole arms to bring the currents in the first and second dipole arms into an improved relationship to a current in a dipole of the lower frequency radiator.*

*33. A base station antenna, comprising:*

*a lower frequency band radiator;*

*a higher frequency band radiator; and*

*a first parasitic element that includes a first metal dipole arm, a second metal dipole arm and a first inductive element coupled between the first metal dipole arm and the second metal dipole arm,*

*wherein the first lower frequency band radiator comprises a first dipole that includes a first dipole arm and a second dipole arm,*

*wherein the first dipole arm includes at least a first segment and a second segment that are separated by a gap,*

*wherein the first segment is electrically connected to the second segment, and*

*wherein an electrical element is disposed between the first segment and the second segment of the first dipole arm, the electrical element configured to reduce high band currents in the first lower frequency band radiator.*

*34. The base station antenna of claim 33, wherein the first and second segments of the first dipole arm are separated by a high impedance section.*

*35. The base station antenna of claim 33, wherein the first segment and the second segment of the first dipole arm each comprise an electrically conducting elongated body.*

*36. The base station antenna of claim 33, wherein the gap is configured to interrupt currents in the higher frequency band.*

*37. The base station antenna of claim 33, wherein the first dipole is coupled to an antenna feed of the base station antenna by a series inductor.*

*38. A base station antenna, comprising:*

*a lower frequency band radiator;*

*a higher frequency band radiator; and*

*a first parasitic element that includes a first metal dipole arm, a second metal dipole arm and a first inductive element coupled between the first metal dipole arm and the second metal dipole arm,*

*wherein the first lower frequency band radiator comprises a first dipole that includes a first dipole arm and a second dipole arm,*

*wherein the first dipole arm includes at least a first segment and a second segment that are separated by a gap,*

*wherein the first lower frequency band radiator comprises a second dipole, and*

*wherein the first and second dipoles are in a cross configuration.*

*39. A base station antenna, comprising:*

*a lower frequency band radiator;*

*a higher frequency band radiator; and*

*a first parasitic element that includes a first metal dipole arm, a second metal dipole arm and a first inductive element coupled between the first metal dipole arm and the second metal dipole arm,*

*wherein the higher frequency band radiator comprises an ultrawideband radiator that operates in the 1710-2690 MHZ frequency range.*

*40. A base station antenna, comprising:*

*a lower frequency band radiator;*

*a higher frequency band radiator; and*

*a first parasitic element that includes a first metal dipole arm, a second metal dipole arm and a first inductive element coupled between the first metal dipole arm and the second metal dipole arm,*

*wherein the lower frequency band radiator comprises first and second crossed dipoles that are positioned at a height of about one-quarter of a wavelength of a frequency within the lower frequency band above a metal groundplane.*

*41. A base station antenna, comprising:*

*a lower frequency band radiator;*

*a higher frequency band radiator; and*

*a first parasitic element that includes a first metal dipole arm, a second metal dipole arm and a first inductive element coupled between the first metal dipole arm and the second metal dipole arm,*

*wherein the first metal dipole arm and the second metal dipole arm are each approximately one quarter of a wavelength of a frequency within the lower frequency band.*

*42. An auxiliary radiating element for a base station antenna, comprising:*

*a first metal dipole arm;*

*a second metal dipole arm; and*

*an inductive element coupled between the first metal dipole arm and the second metal dipole arm,*

*wherein the auxiliary radiating element is a non-driven parasitic element,*

*wherein the first and second metal dipole arms comprise metallization on a printed circuit board, and*

*wherein the inductive element is configured to adjust the phase of currents in the first and second metal dipole arms to bring the currents into an improved relationship to a current in a dipole of a radiating element of the base station antenna.*

* * * * *